US012638838B2

(12) United States Patent
Lee

(10) Patent No.: US 12,638,838 B2
(45) Date of Patent: May 26, 2026

(54) AI SYSTEM FOR WAFER DEFECT DETECTION

(71) Applicant: APPLE T Co., Ltd., Yongin-si (KR)

(72) Inventor: Han Chul Lee, Cheongju-si (KR)

(73) Assignee: APPLE T Co., Ltd., Yongin-si (KR)

( * ) Notice: Subject to any disclaimer, the term of this patent is extended or adjusted under 35 U.S.C. 154(b) by 429 days.

(21) Appl. No.: 18/529,345

(22) Filed: Dec. 5, 2023

(65) Prior Publication Data

US 2024/0419158 A1 Dec. 19, 2024

(30) Foreign Application Priority Data

Jun. 16, 2023 (KR) ........................ 10-2023-0077424

(51) Int. Cl.
*G05B 23/02* (2006.01)

(52) U.S. Cl.
CPC ...... *G05B 23/0229* (2013.01); *G05B 2223/06* (2018.08)

(58) Field of Classification Search
CPC ........................ G05B 2223/06; G05B 23/0229
USPC ............................................. 700/110; 702/81
See application file for complete search history.

(56) References Cited

U.S. PATENT DOCUMENTS

| | | | | |
|---|---|---|---|---|
| 5,859,964 A * | 1/1999 | Wang | ...................... | H10P 74/23 |
| | | | | 714/48 |
| 6,388,747 B2 * | 5/2002 | Nara | ................... | G03F 7/70616 |
| | | | | 356/394 |

| | | | | |
|---|---|---|---|---|
| 2004/0121495 A1 * | 6/2004 | Sonderman | ............. | H10P 74/23 |
| | | | | 257/E21.525 |
| 2006/0074599 A1 * | 4/2006 | Emigholz | ............ | C10G 11/187 |
| | | | | 702/185 |
| 2011/0129142 A1 * | 6/2011 | Takahashi | ............. | G06T 7/0004 |
| | | | | 382/149 |
| 2019/0163866 A1 * | 5/2019 | Liu | ......................... | G06F 30/20 |
| 2020/0089130 A1 * | 3/2020 | Chao | ..................... | G03F 7/7065 |
| 2022/0043812 A1 * | 2/2022 | Tang | ..................... | G06F 16/906 |
| 2022/0284167 A1 | 9/2022 | Chao | | |

FOREIGN PATENT DOCUMENTS

| | | | | | |
|---|---|---|---|---|---|
| EP | | 3106948 A1 * | 12/2016 | .......... | H05K 13/082 |
| KR | 10-2003-0050320 A | | 6/2003 | | |
| KR | 10-1396907 B1 | | 5/2014 | | |

(Continued)

OTHER PUBLICATIONS

An Office Action mailed by Taiwan Intellectual Property Office on Mar. 11, 2024, which corresponds to Taiwanese Patent Application No. 112143590 and is related to U.S. Appl. No. 18/529,345.

*Primary Examiner* — Chun Cao
(74) *Attorney, Agent, or Firm* — Studebaker Brackett PLLC

(57) ABSTRACT

An artificial intelligence (AI) system for wafer defect detection may include a CIS device configured to mount to track equipment and to transmit a scanned image of a wafer to a database; and a server configured to learn the scanned image, to distinguish a defect of the wafer for each defect category, to learn defects that occur in exposure equipment and the track equipment for each type, and to perform real-time monitoring. The server is configured to change a periodic sampling inspection to a total inspection method through the CIS device in response to occurrence of the defect in the wafer.

10 Claims, 15 Drawing Sheets

(56)  References Cited

FOREIGN PATENT DOCUMENTS

| KR | 10-2016-0042023 A | 4/2016 |
|----|-------------------|--------|
| KR | 10-2016-0137836 A | 12/2016 |
| KR | 10-1991170 B1 | 6/2019 |
| KR | 10-2022-0170351 A | 12/2022 |
| KR | 10-2023-0027500 A | 2/2023 |
| TW | M550465 U | 10/2017 |
| TW | 202121553 A | 6/2021 |
| TW | I751376 B | 1/2022 |

* cited by examiner

FIG. 1

| Classification | Defect occurrence results | | |
|---|---|---|---|
| Coating defect | | | |
| Developing defect | | | |
| Scratch | | | |
| Defocus | | | |

FIG. 2

Center, radius,
area

Distance from
reference line

Distance between
two pixels

Distance from
defect group

FIG. 9B

| DWS PROCESSING MODE | DEFECT OVERLAPPING MODE | EBR CHECKW MODE | SERCH |
| --- | --- | --- | --- |

| YYYY | MM | DD | TIME hh:mm ~ hh:mm |
| --- | --- | --- | --- |
| DEVICE | LAYER | PROC ID | LOT ID 25 |
| DEVICE AAAAAA | LAYER BBBBBB | PROC ID DDDDD | |

| LOT ID | SLOT ID | Decision | EBR CHECK POINT | | | |
| --- | --- | --- | --- | --- | --- | --- |
| | | | LEFT | RIGHT | BOTTOM | TOP |
| CCCCCC | 1 | OK | 1.00 | 1.10 | 1.05 | 1.00 |
| CCCCCC | 2 | OK | 1.00 | 1.08 | 1.05 | 1.00 |
| CCCCCC | 3 | OK | 1.00 | 1.10 | 1.05 | 1.20 |
| CCCCCC | 4 | OK | 1.20 | 1.10 | 0.98 | 1.13 |
| CCCCCC | 5 | OK | 1.11 | 1.10 | 1.03 | 1.00 |
| CCCCCC | 6 | OK | 1.13 | 1.10 | 1.05 | 1.09 |
| CCCCCC | 7 | OK | 1.00 | 1.10 | 1.04 | 1.00 |
| CCCCCC | 8 | OK | 1.00 | 1.10 | 1.05 | 1.04 |
| CCCCCC | 9 | NG | 1.00 | 1.07 | 1.10 | 1.00 |
| CCCCCC | 10 | OK | 1.00 | 1.10 | 1.05 | 1.02 |
| CCCCCC | 11 | OK | 1.00 | 1.10 | 1.07 | 1.00 |
| CCCCCC | 12 | OK | 1.00 | 1.10 | 1.05 | 1.00 |
| CCCCCC | 13 | OK | 1.08 | 1.13 | 1.06 | 1.06 |
| CCCCCC | 14 | OK | 1.00 | 1.10 | 1.05 | 1.70 |
| CCCCCC | 15 | OK | 1.09 | 1.02 | 1.05 | 1.00 |
| CCCCCC | 16 | OK | 1.00 | 1.10 | 1.03 | 1.00 |
| CCCCCC | 17 | OK | 1.07 | 1.09 | 1.10 | 1.00 |
| CCCCCC | 18 | OK | 1.00 | 1.10 | 1.05 | 1.00 |
| CCCCCC | 19 | OK | 1.12 | 1.05 | 1.05 | 1.08 |
| CCCCCC | 20 | OK | 1.00 | 1.10 | 1.05 | 1.00 |
| CCCCCC | 21 | OK | 1.00 | 1.10 | 1.05 | 1.05 |
| CCCCCC | 22 | OK | 1.00 | 1.04 | 1.05 | 1.00 |
| CCCCCC | 23 | OK | 1.00 | 1.10 | 1.05 | 1.03 |
| CCCCCC | 24 | OK | 1.00 | 1.07 | 1.05 | 1.00 |
| CCCCCC | 25 | OK | 1.00 | 1.10 | 1.05 | 1.00 |

LOT ID: #####/EBR. TREND

LEFT — RIGHT — BOTTOM — TOP

AI SYSTEM FOR WAFER DEFECT DETECTION

CROSS-REFERENCE TO RELATED APPLICATION(S)

This application claims the benefit under 35 USC § 119(a) of Korean Patent Application No. 10-2023-0077424 filed on Jun. 16, 2023 in the Korean Intellectual Property Office, the entire disclosure of which is incorporated herein by reference for all purposes.

BACKGROUND

1. Field

At least one example embodiment relates to an artificial intelligence (AI) system for wafer defect detection, and more particularly, to an AI analysis system and a machine vision CIS (Contact Image Sensor) device for detecting a wafer defect that occurs in a semiconductor photolithography process.

2. Description of Related Art

A wafer refers to a disk-shaped silicon substrate used in a semiconductor manufacturing process, uses various diameters that generally range from 6 inches to 12 inches, and is used to manufacture a semiconductor chip through a plurality of processes to form a fine circuit and structure.

A wafer defect that occurs in a semiconductor photolithography process may occur in very different ways due to complexity of a manufacturing process. Therefore, a defective product needs to be quickly and accurately detected in a semiconductor manufacturing process to prevent a decrease in yield.

SUMMARY

An objective of at least one example embodiment is to provide an artificial intelligence (AI) system for wafer defect detection.

Also, an objective of at least one example embodiment is to provide an AI analysis system and a machine vision CIS (Contact Image Sensor) device for detecting a wafer defect that occurs in a semiconductor photolithography process.

Also, an objective of at least one example embodiment is to prevent a decrease in yield by quickly and accurately detecting a defective product in a semiconductor manufacturing process.

According to an aspect of at least one example embodiment, there is provided an AI system for wafer defect detection, the AI system including a CIS device configured to mount to track equipment and to transmit a scanned image of a wafer to a database; and a server configured to learn the scanned image, to distinguish a defect of the wafer for each defect category, to learn defects that occur in exposure equipment and the track equipment for each type, and to perform real-time monitoring, wherein the server is configured to change a periodic sampling inspection to a total inspection method through the CIS device in response to occurrence of the defect in the wafer.

The AI system may further include a monitoring device configured to control a job process for the exposure equipment and the track equipment in conjunction with the server and to transmit or receive information management and inspection results of the wafer.

The server may be configured to control an operation of corresponding equipment in which the defect occurred using an interlock to be stopped when the defect is determined to have occurred in the exposure equipment or the track equipment.

The server may include a first server configured to operate as a Manufacturing Execution System (MES) server of a wafer defect inspection monitoring system; a second server configured to store the scanned image; and a third server configured to operate as a Data Migration Service (DMS) server that is provided between the first server and the second server and to perform data processing on an image of the wafer.

An image detected as a defective chip among the scanned images may be separately stored in the first server of the wafer defect inspection monitoring system and learning of the image detected as the defective chip is separately performed in the third server, and results and data of the separately performed learning may be transmitted from the third server to the wafer defect inspection monitoring system.

When a trigger sensor is mounted to the track equipment, acquisition of the image may start in response to sensing of the trigger sensor and when the trigger sensor is absent, image is acquired by verifying entry of the wafer using a vision algorithm and the acquired image and defective image may be transmitted to the first server of the wafer defect inspection monitoring system through a Secure Shell File Transfer Protocol (SFTP) or a Network File System (NFS), and inspection results for the defective chip may be transmitted from the third server to the first server in response to an end signal indicating end of an inspection operation of the wafer or on the basis of the wafer or a LOT that is a batch of wafers.

The third server may be configured to remove noise according to a mechanical error occurring in the exposure equipment or the track equipment, to acquire an image difference on a pixel basis for each adjacent chip within the wafer, to learn a normal chip image and a defective chip image using a deep learning program, and to directly distinguish and register a normal chip and a defective chip on a chip basis within the wafer based on results of the learning.

The server may be configured to perform preprocessing for detecting the defect in the wafer by adjusting color and brightness of the wafer according to a size of the wafer, to separately display the scanned image of the wafer into three color channels of red, green, and blue to be verified by color for each defect detection characteristic, to correct brightness of the scanned image of the wafer, and to map and display an intensity vale for each pixel of the scanned image of the wafer to a color according to a table or a function.

The CIS device may be configured to acquire information related to the wafer including a device ID, a layer ID, a process job ID, a recipe ID, a wafer ID, and a slot ID when a driving control system operates or is present at a specific first position through a CIS module ready trigger and to acquire an image related to the wafer when the driving control system operates or is present at a specific second position through a frame grabber trigger.

The monitoring device may be configured to accumulate and display X and Y coordinates of defect detection positions of wafers that have undergone the same process in a coordinate image of a wafer displayed on a display in a first mode that is a defect detection mode, to display results from an end of each of the wafers to a position at which a pattern is removed according to recipe settings for each process based on images of the wafers in a second mode that is an error check mode, and to display results related to a wafer defect based on an image of a specific area of a wafer currently in progress in a third mode that is a real-time wafer defect determination mode.

According to some example embodiments, it is possible to provide an AI system for wafer defect detection.

According to some example embodiments, it is possible to provide an AI analysis system and a machine vision CIS device for detecting a wafer defect that occurs in a semiconductor photolithography process.

According to some example embodiments, it is possible to prevent a decrease in yield by quickly and accurately detecting a defective product in a semiconductor manufacturing process.

According to some example embodiments, it is possible to perform real-time monitoring by integrating AI deep learning and machine learning through development of an AI system for detecting a wafer defect that occurs in a photolithography process of a semiconductor manufacturing process.

According to some example embodiments, it is possible to learn defects that occur in exposure equipment and track equipment for each type and to provide statistics to a user through real-time monitoring.

According to some example embodiments, it is possible to develop a system capable of preventing continuous defect occurrence by immediately stopping an operation using a self-interlock.

The aforementioned features and effects of the disclosure will be apparent from the following detailed description related to the accompanying drawings and accordingly those skilled in the art to which the disclosure pertains may easily implement the technical spirit of the disclosure.

BRIEF DESCRIPTION OF THE DRAWINGS

These and/or other aspects, features, and advantages of the disclosure will become apparent and more readily appreciated from the following description of example embodiments, taken in conjunction with the accompanying drawings of which:

FIG. 1 illustrates results of defects caused by a coating defect, a developing defect, a scratch, and a defocus in relation to wafer defect detection according to an example embodiment;

FIG. 2 illustrates a configuration of an artificial intelligence (AI) system for wafer defect detection according to an example embodiment;

FIGS. 9A, 9B, and 9C illustrate user interface (UI) screens displayed on a monitoring device in a plurality of modes according to example embodiments.

DETAILED DESCRIPTION

Specific structural or functional descriptions related to example embodiments according to the concept of the disclosure set forth herein are simply provided to explain the example embodiments according to the concept of the disclosure and the example embodiments according to the concept of the disclosure may be implemented in various forms and are not limited to the example embodiments described herein.

Hereinafter, example embodiments will be described with reference to the accompanying drawings. In this regard, FIG. 1 illustrates results of defects caused by a coating defect, a developing defect, a scratch, and a defocus in relation to wafer defect detection according to an example embodiment.

Referring to FIG. 1, a coating defect may occur since photoresist is not maintained in a liquid state until the photoresist is applied to a substrate and used. A collapse in a photo resistor (PR) pattern may cause a developing defect, that is, a poor development. In this regard, a part that receives light may change from insoluble to soluble in a developer during development, which may lead to a chain breakage. Due to particles in equipment, a scratch phenomenon may occur. A defocus phenomenon may occur due to a defect that is not defined as a desired image pattern within a wafer.

Figure 2:
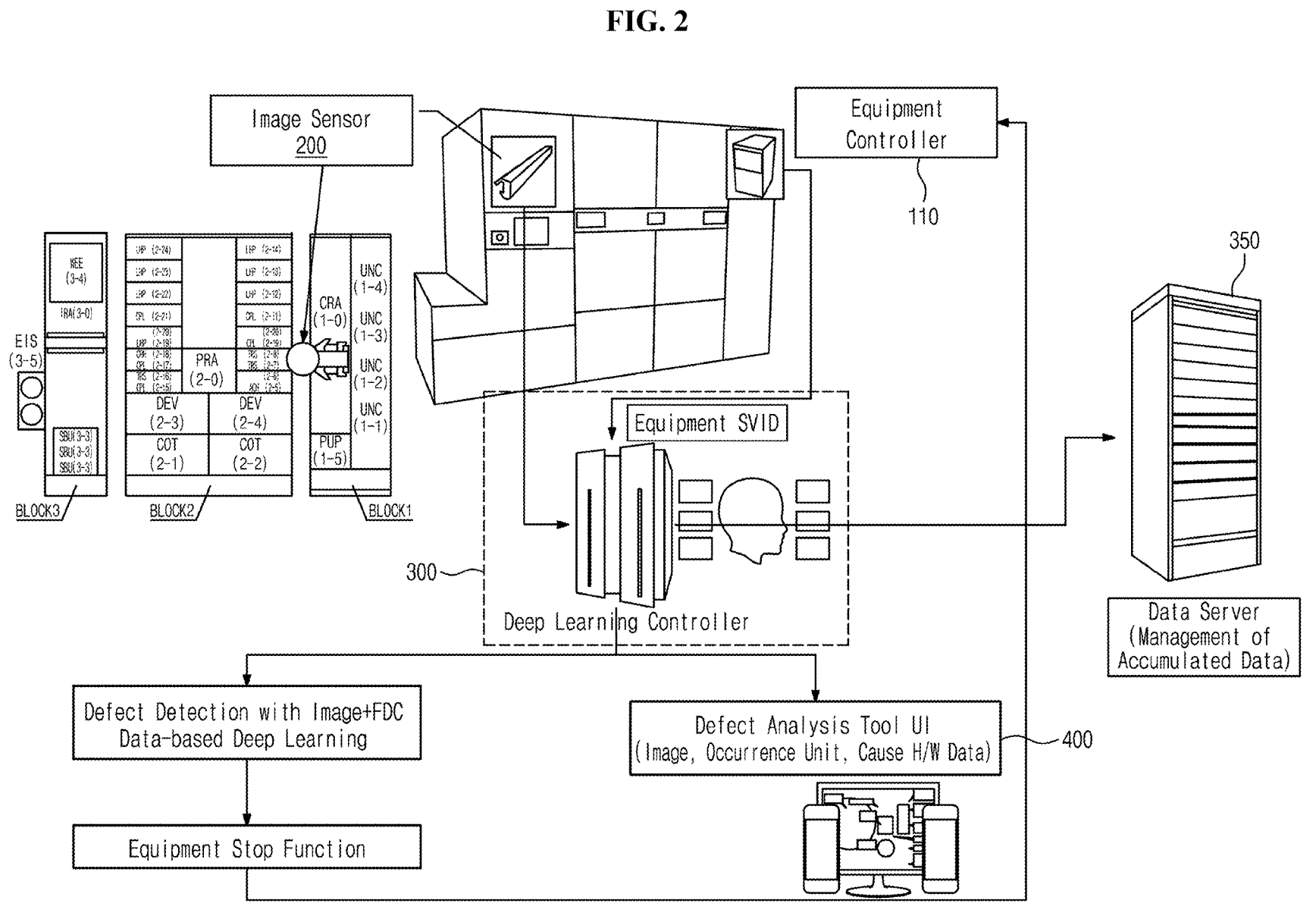
Figure 3:
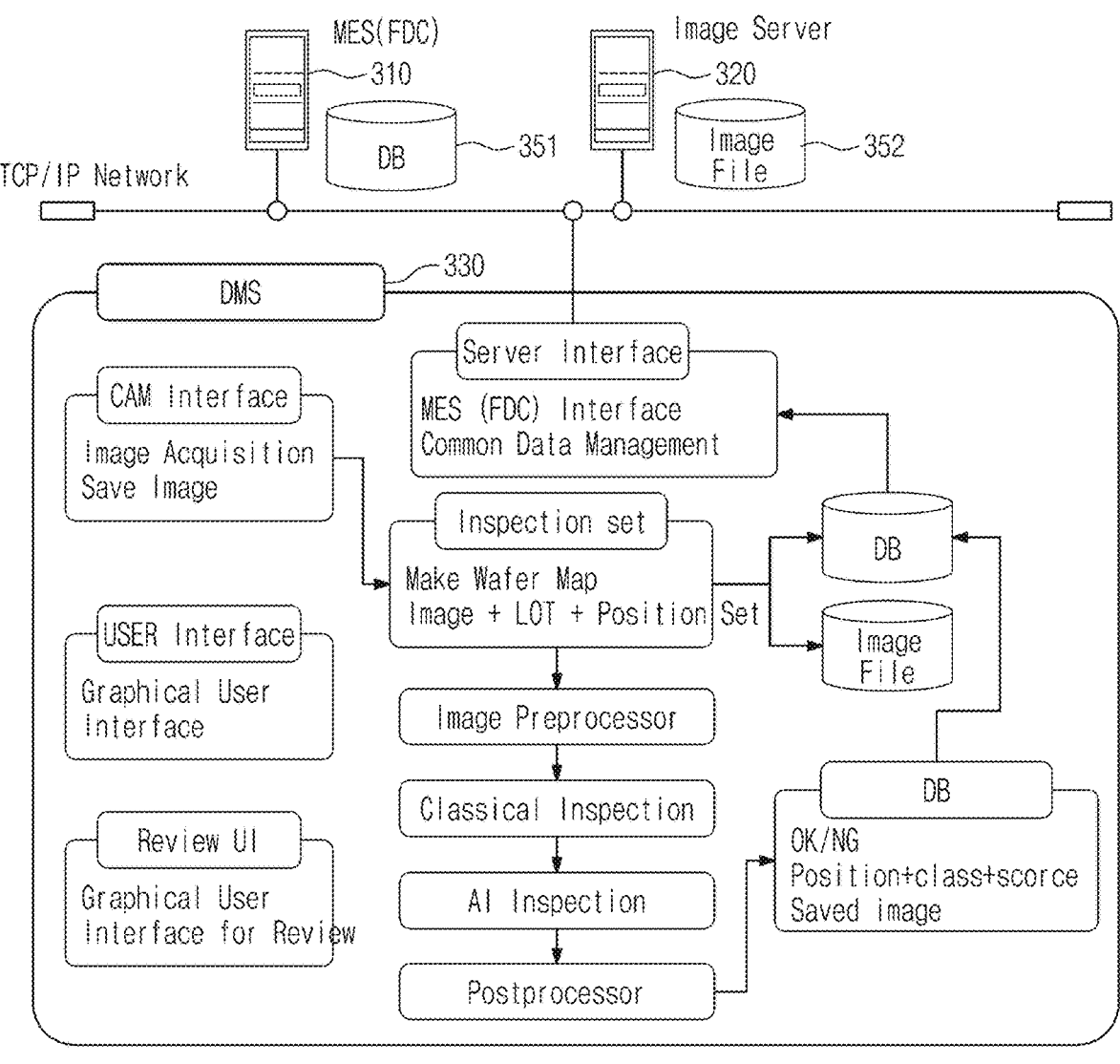
FIG. 3 illustrates a configuration of a plurality of servers connectable to a monitoring device in the AI system of FIG. 2.

FIG. 2 illustrates a configuration of an artificial intelligence (AI) system for wafer defect detection according to an example embodiment, and FIG. 3 illustrates a configuration of a plurality of servers connectable to a monitoring device in the AI system of FIG. 2.

Referring to FIGS. 2 and 3, the AI system for wafer defect detection may include equipment 100, a CIS device 200, and a server 300. The equipment 100 may include track equipment configured to transfer a wafer and track a transfer status and/or exposure equipment configured to perform exposure of a photolithography process. The AI system for wafer defect detection may be configured to further include a monitoring device 400. The equipment 100 may include an equipment controller 110 configured to control a process and a driving of the equipment 100.

The CIS device 200 may include an image sensor, for example, a complementary metal oxide semiconductor (CMOS) image sensor, and a controller configured to drive the image sensor. The CIS device 200 may also be referred to as the image sensor. The CIS device 200 may be mounted to the track equipment and may transmit a scanned image of the wafer to a database 350. The server 300 may learn the scanned image and may distinguish a defect of the wafer for each defect category.

The server 300 may learn defects that occur in the exposure equipment and the track equipment for each type and may perform real-time monitoring. In response to occurrence of the defect in the wafer, the server 300 may change a periodic sampling inspection to a total inspection method through the CIS device 200.

The CIS device 200 may acquire an image from a single camera or a plurality of cameras. In this regard, a wafer image may be displayed in a form of a front view or a front/back view and may be designed in a configuration in which even a change in a camera arrangement that is a vision part does not affect the overall system.

The monitoring device 400 may be configured to control a job process for the exposure equipment and the track equipment in conjunction with the server 300 and to transmit or receive information management and inspection results of the wafer. The monitoring device 400 may be a personal computer (PC), a laptop, or a mobile device configured to interact with the server 300.

When the defect is determined to have occurred in the exposure equipment or the track equipment, the server 300 may control an operation of corresponding equipment in which the defect has occurred to be stopped using an interlock. To this end, the server 300 may receive the interlock that is generated by the monitoring device 400 and may control an operation of the corresponding equipment in which the defect has occurred to be stopped.

The server 300 may include a first server 310, a second server 320, and a third server 330. The first server 310 may be configured to operate as a Manufacturing Execution System (MES) server of a wafer defect inspection monitoring system. The second server 320 may be configured to store the scanned image. The third server 330 may be provided between the first server 310 and the second server 320. The third server 330 may operate as a Data Migration Service (DMS) server configured to perform data processing on an image of the wafer.

An image detected as a defective chip among scanned images may be separately stored in the first server 310 of the wafer defect inspection monitoring system or a database 351 that interacts with the first server 310. Learning of the image detected as the defective chip may be separately performed in the third server 330. Results and data of the separately performed learning may be transmitted from the third server 330 to the first server 310 of the wafer defect inspection monitoring system and the monitoring device 400 operatively connected to the first server 310.

An interface between a runtime PC that is the monitoring device 400 interacting with the first server 310 constituting a wafer defect analysis monitoring system and the first server 310 that is the MES server may be configured to include a job process control function, an inspection wafer information management function, and an inspection result transmission/reception function.

The first server 310 that is the MES server uses SEMI Equipment Communication Standard (SECS)/General Equipment Model (GEM)-based communication. However, since a self-communication format or database is used, a communication simulator may be designed in a structure that may respond in common.

The wafer defect analysis monitoring system may be designed to cause an interlock to be generated in the first server 310 that is the MES server such that equipment in which a defect is detected may be stopped, when the defect occurs as a result of wafer inspection.

The third server 330 that operates as the DMS server may include a plurality of interfaces. The third server 330 may include a CAM interface, a server interface, and a user interface. The third server 330 may acquire and store an image through the CAM interface. The third server 330 may perform common data management in conjunction with the first server 310 that is the MES server through the server interface.

The third server 330 may acquire process-related data from the database 351 that interacts with the first server 310 and the scanned image of the wafer from the database 352 that interacts with the second server 320.

Meanwhile, the AI system for wafer defect detection according to an example embodiment may interact with a plurality of servers and may perform data collection and defect detection on a chip basis in a specific area of the wafer.

Figure 4A:
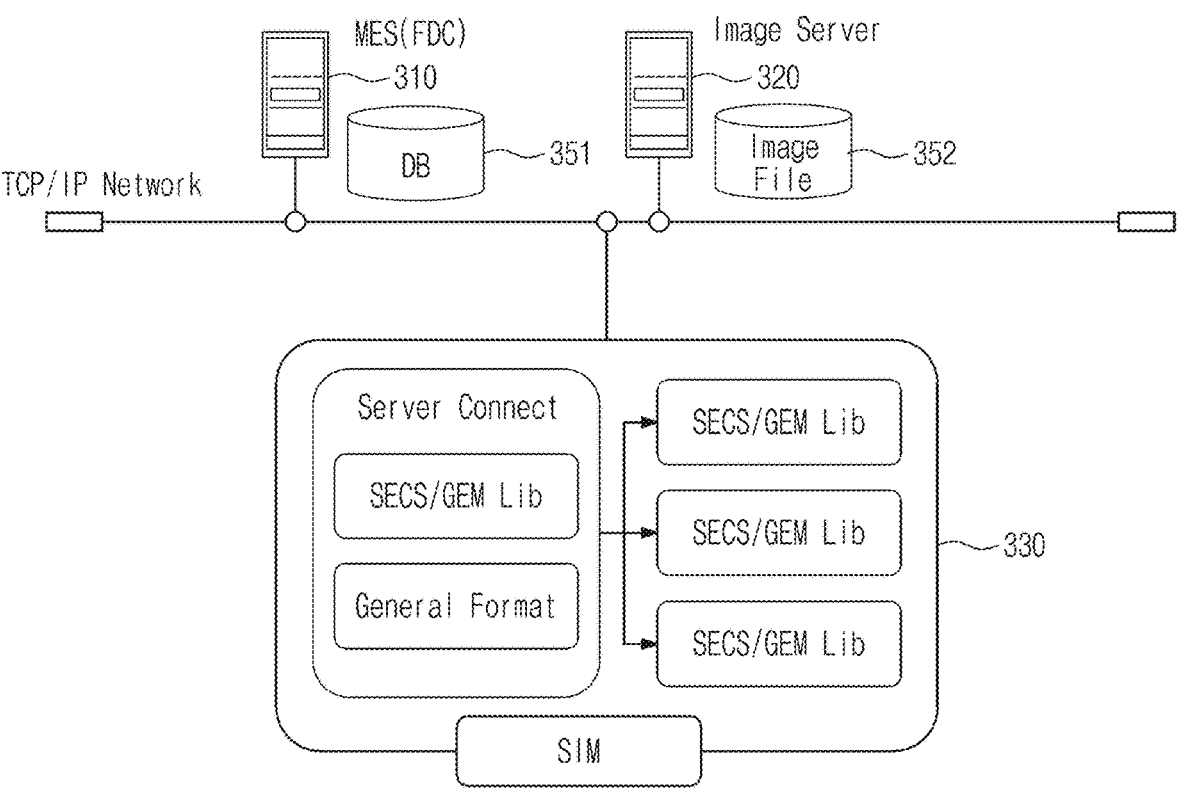
FIG. 4A illustrates an interaction configuration of a plurality of servers for automating data status management in an AI system for wafer defect detection according to an example embodiment.
Figure 4B:
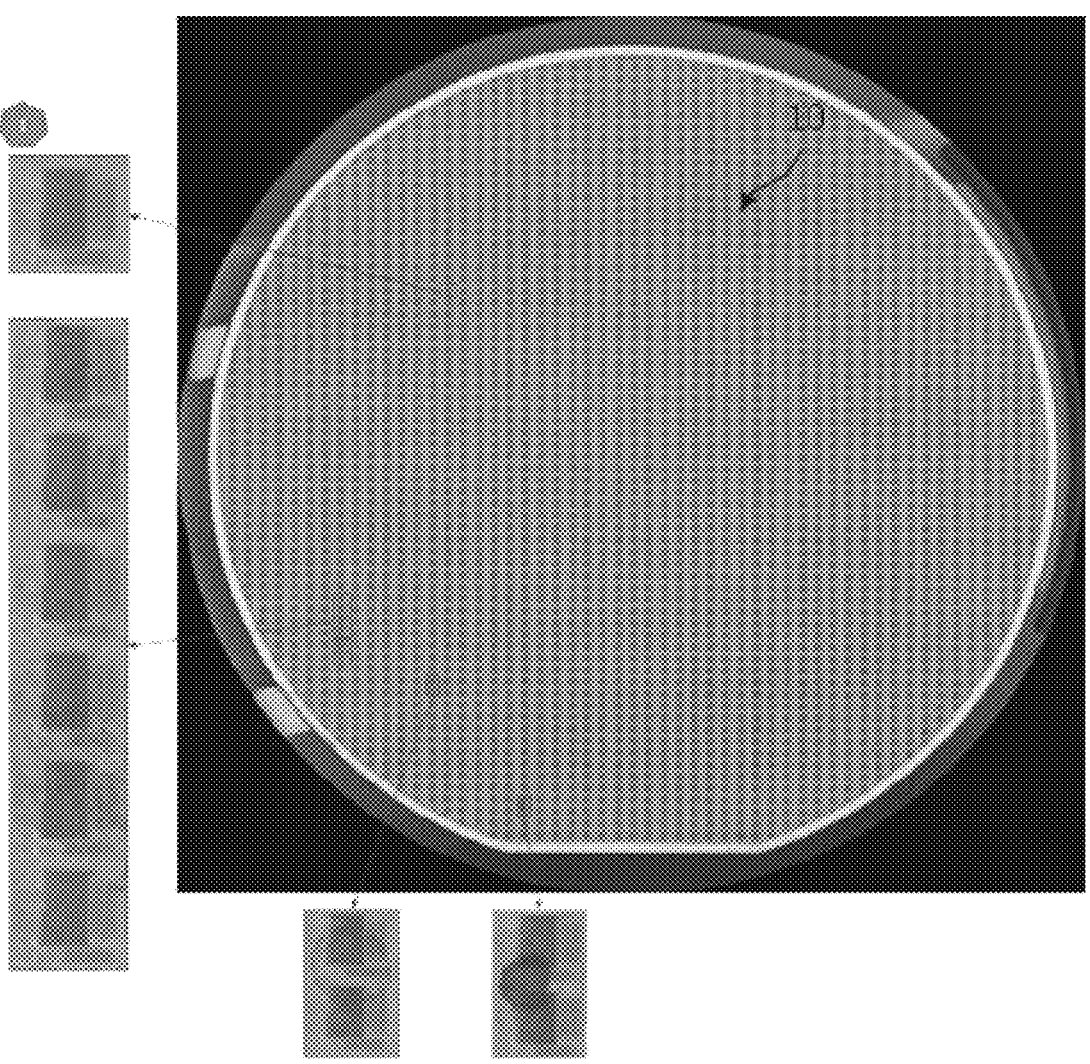
FIG. 4B illustrates a conceptual diagram of collecting data capable of detecting a defect on a chip basis of a specific area of a wafer according to an example embodiment.

In this regard, FIG. 4A illustrates an interaction configuration of a plurality of servers for automating data status management in an AI system for wafer defect detection according to an example embodiment, and FIG. 4B illustrates a conceptual diagram of collecting data capable of detecting a defect on a chip basis of a specific area of a wafer according to an example embodiment.

Referring to FIGS. 3A and 4A, an inspection function of the third server 330 that is the DMS server may perform control through communication with the first server 310 that is the MES server. To maintain LOT information on a LOT basis that is a batch of wafers during inspection, connection to the servers 310, 320, and 330 may be performed in various ways. Inspection results and Fault Detection&Classification (FDC) data may be configured to be exchanged with the servers 310, 320, and 330.

In the case of supporting server communication according to a SEMI Equipment Communication Standard (SECS)/General Equipment Model (GEM) protocol, a wafer inspection operation may start in response to a "Cassette Start" signal that is a start signal. Also, the wafer inspection operation may be stopped in response to a "Cassette End" signal that is an end signal. Meanwhile, if the end signal is not received and the inspection does not proceed even after a set time elapses after start, the wafer inspection operation may be automatically stopped.

Referring to FIG. 4B, a wafer 10 may be manufactured using silicon as a raw material and may be implemented with various diameters and thicknesses, for example, representative diameters of 200 mm and 300 mm. A thickness of the wafer 10 is generally 0.725 mm±0.02 and a size of each chip may vary depending on a diameter and a thickness of the wafer 10. The quantity available for a chip design may vary depending on a size of the wafer 10, a size of the chip, and precision of technology and equipment used for a semiconductor manufacturing process.

For example, in the case of manufacturing a chip using 10 nm technology through the wafer 10 with the diameter of 300 mm, thousands of chips may be manufactured on a single wafer 10. Base on such characteristics, data for learning an image of the wafer including the plurality of chips may be collected.

When each process or equipment engineer of a chip maker registers a golden wafer image and a normal chip image 1 as shown in FIG. 4B to the wafer defect inspection monitoring system, the wafer defect inspection monitoring system performs a chip-unit inspection. When a defect is detected, the detected defect may be visually displayed at a corresponding position for easy understanding.

An image detected as a defective chip may be separately stored in a server of the wafer defect inspection monitoring system, learning for the defective image may be separately performed, learned contents may be transmitted from the server to the wafer defect inspection monitoring system.

Meanwhile, an AI system for wafer defect detection according to an example embodiment may be designed as an image acquisition and transmission system and may also be designed with a deep-learning-based AI inspection process.

Figure 5A:
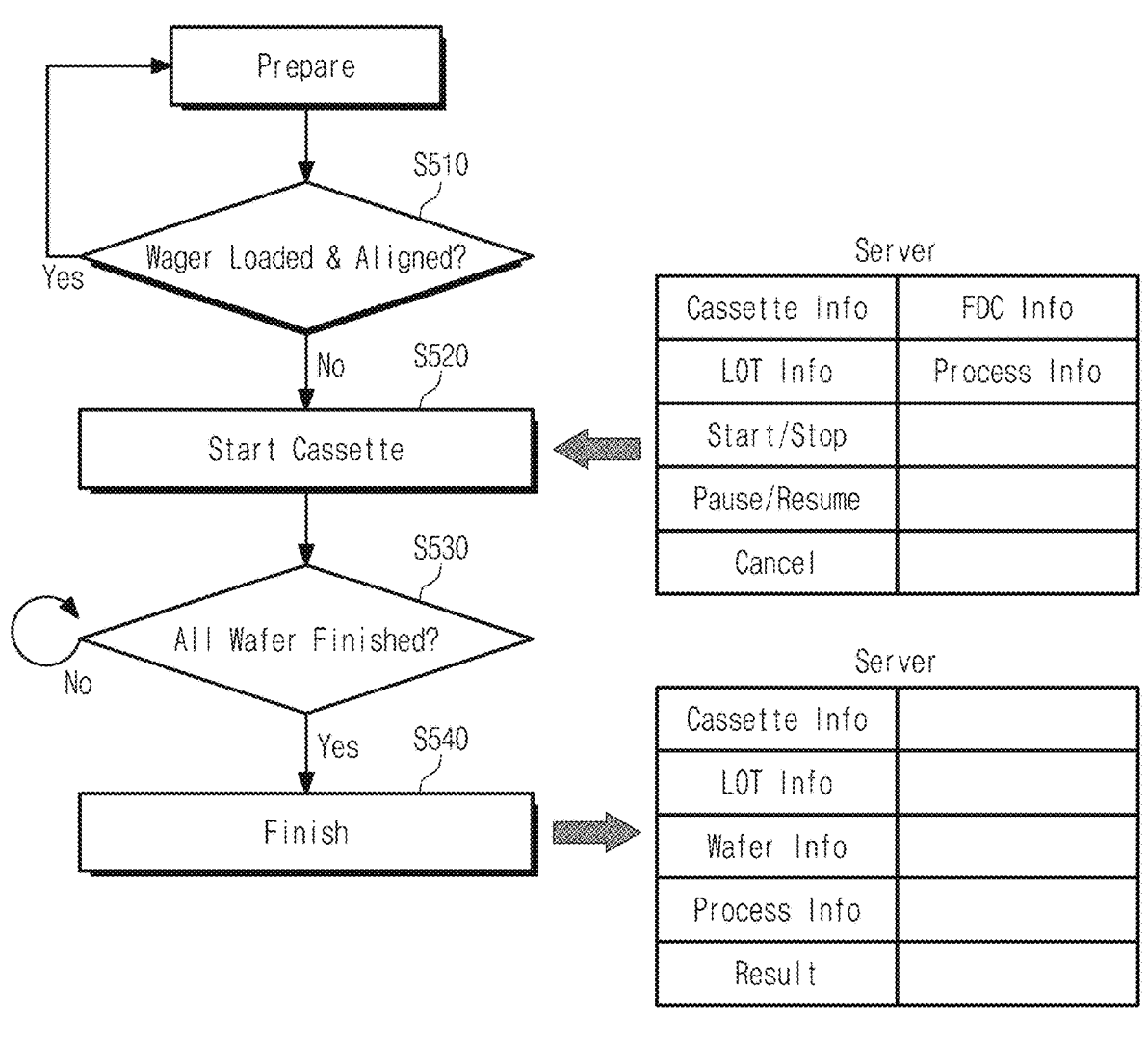
FIGS. 5A and 5B are flowcharts in which an AI system for wafer defect detection is designed as an image acquisition and transmission system and also designed with a deep-learning-based AI inspection process according to an example embodiment.
Figure 5B:
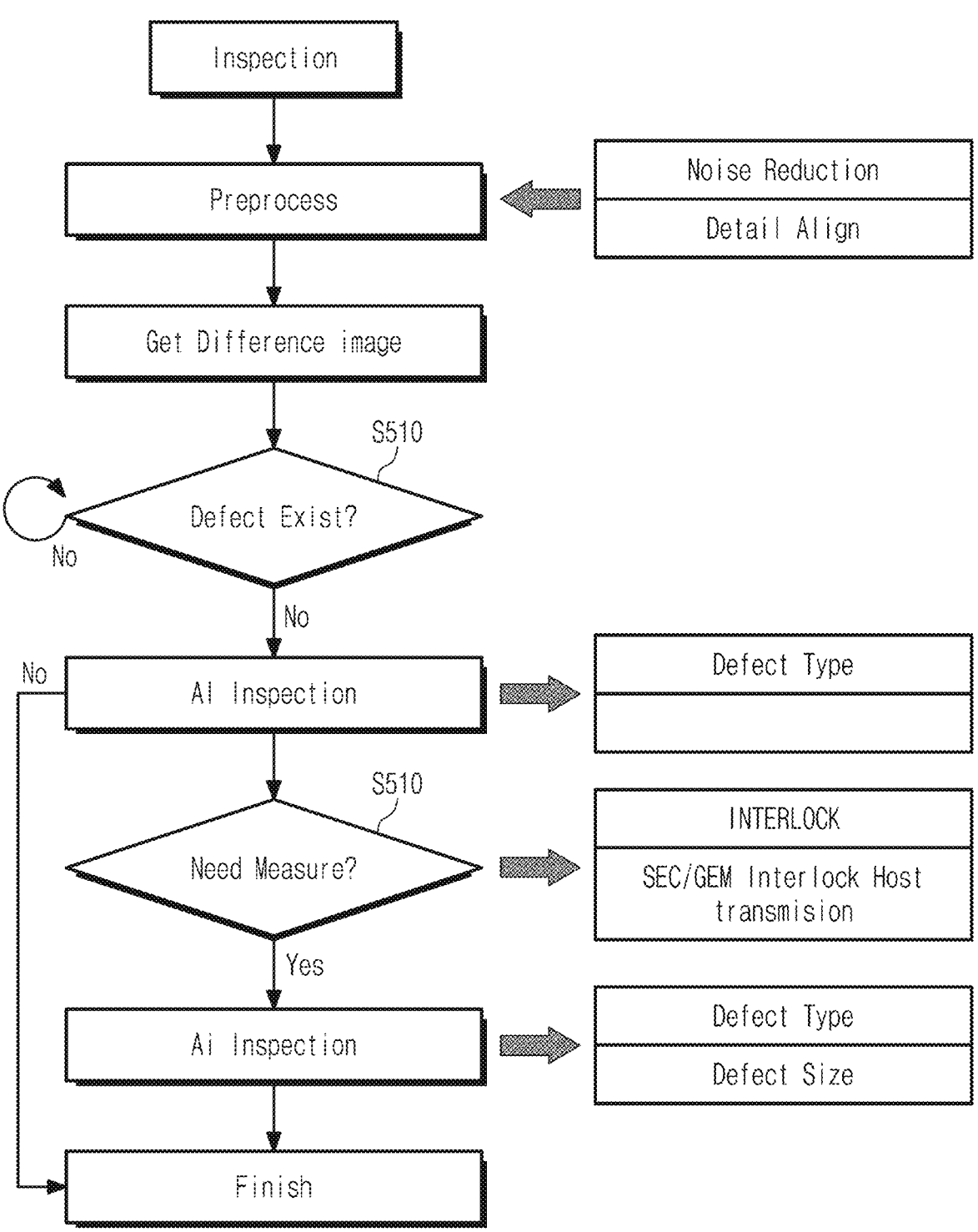

FIGS. 5A and 5B are flowcharts in which an AI system for wafer defect detection is designed as an image acquisition and transmission system and also designed with a deep-learning-based AI inspection process according to an example embodiment.

Referring to FIG. 5A, in operation S510, whether a wafer is loaded and aligned at a specific position may be determined. When the wafer is loaded and aligned at the specific position, a wafer inspection operation may start in response to a "Cassette Start" signal that is a start signal in operation S520. In operation S530, whether a job on all wafers is completed may be determined. When the job on all wafers is completed, image acquisition and transmission may be completed in operation S540.

In this regard, when a trigger sensor is mounted to the track equipment, image acquisition of the wafer may start in response to sensing of the trigger sensor. When the trigger sensor is absent, the image of the wafer may be acquired by verifying entry of the wafer.

Referring to FIGS. 3 and 5A, images and defective images acquired after performing report and inspection to "Cassette End" according to a SECS/GEM scenario may be transmitted to the first server 310 of the wafer defect inspection monitoring system through a Secure Shell File Transfer Protocol (SFTP) or a Network File System (NFS). Inspection results may be transmitted to the first server 310 that is the MES server according to the SECS/GEM scenario. Basically, an image is transmitted according to Cassette End, but may be designed to support wafer or LOT unit transmission.

Images and defective images acquired for a wafer or each specific area of the wafer may be transmitted to the first server 310 of the wafer defect inspection monitoring system through the SFTP or the NFS.

Inspection results for defective chips may be transmitted from the third server 330 to the first server 310 based on the wafer or on a LOT basis that is a batch of wafers, in response to an end signal indicating end of a wafer inspection operation.

Referring to FIG. 5B, a system according to an example embodiment may basically employ a method of processing image data or an image in a convolutional neural network (CNN) structure. An importance point of the CNN structure is to detect parts rather than the entire image and to verify correlation between a single pixel of the image and neighboring pixels of the pixel.

Meanwhile, due to variation factors by characteristics of semiconductor photo equipment, such as fine vibration when driving a wafer transfer arm, a wafer tilt, and occurrence of wafer warpage, it may be impossible to simply compare difference between a normal wafer and a defective wafer.

Therefore, the example embodiments apply a new modeling AI algorithm that corrects and compares images using a chip-to-chip die method.

Regarding an evaluation method, 1) primary learning wafer manufacturing may be performed for each defect type. 2) Good and defective products may be directly classified and registered on a chip basis using an AI deep learning program. A learning method may perform AI learning on a normal chip image and a defective chip image. Meanwhile, 3) a wafer defect detection method according to an example embodiment may train normal/defective chips within a wafer instead of learning images of a single wafer. Therefore, up to 1000 images may be learned per wafer and the learning effect about 25000 images may be performed when learning 1 LOT (25 sheets). 4) Additional 100 wafers for evaluation required to verify learning results may be manufactured. 5) Detection results of 85% or more may be secured with the wafers of 4).

Referring to FIGS. 3 and 5B, the third server 330 may perform a preparation process of removing noise according to a mechanical error that occurs in the exposure equipment or the track equipment in operation S510b. The third server 330 may perform a process of acquiring an image difference on a pixel unit for each chip that is adjacent in the wafer in operation S520b.

In operation S530b, the third server 330 may learn a normal chip image and a defective chip image using a deep learning program and may determine whether a defective chip has occurred based on the image difference.

In operation S540b, the third server 330 may directly distinguish and register a normal chip and a defective chip on a chip unit within the wafer based on results of the learning. Also, when the defect is determined to have occurred in the exposure equipment or the track equipment in operation S550b, the third server 330 may control driving of the equipment in which the defect has occurred to be stopped using an interlock in operation S56b.

Meanwhile, the AI system for wafer defect detection according to an example embodiment may be configured to perform preprocessing for defect detection within the wafer. In this regard, FIG. 6A illustrates an example of measurement functions related to data preprocessing and results of a preprocessing process according to an example embodiment, and FIG. 6B illustrates a wafer color map and a wafer heat map related to data preprocessing according to an example embodiment.

Figure 6A:
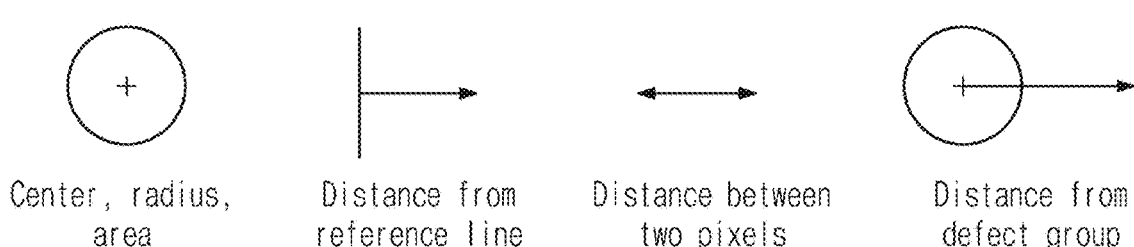
FIG. 6A illustrates an example of measurement functions related to data preprocessing and results of a preprocessing process according to an example embodiment.
Figure 6A:
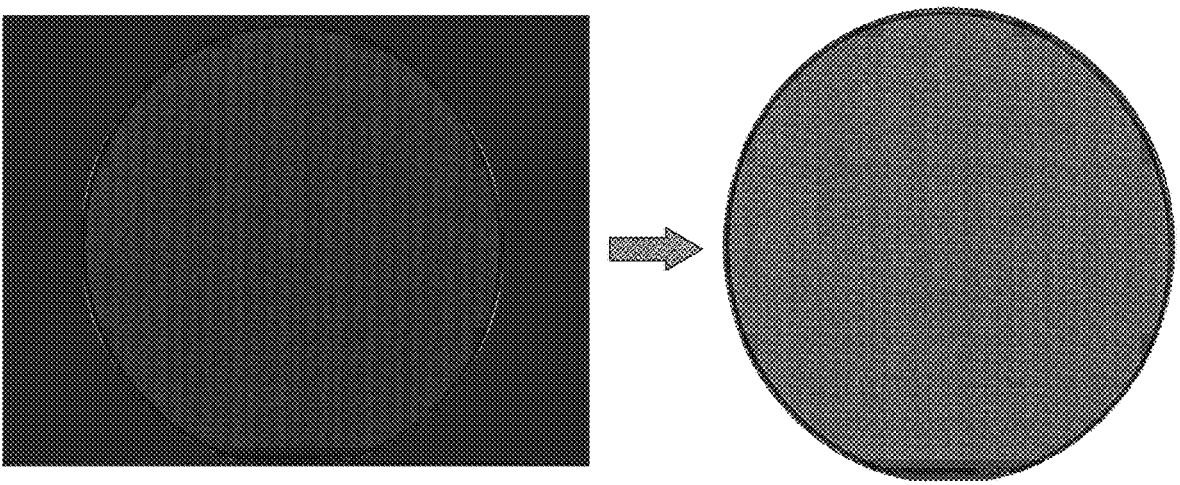

Referring to FIG. 6A, preprocessing for wafer defect detection and image enhancement may be performed by performing process notch or flat zone reference alignment and color adjustment according to a wafer size. In this regard, a data preprocessing system may be configured to perform various functions capable of measuring a size, a length, and an area of a wafer.

Figure 6B:
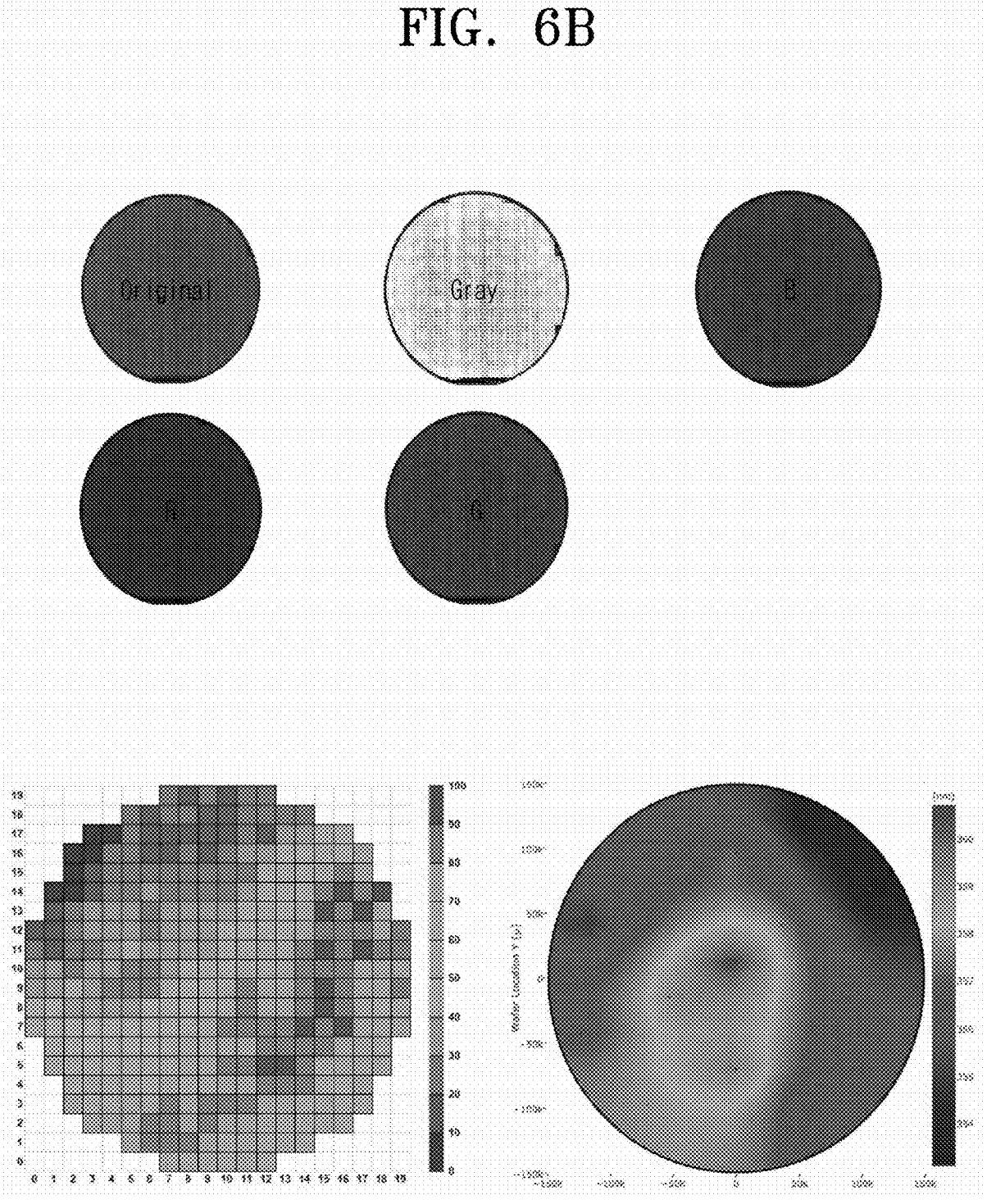
FIG. 6B illustrates a wafer color map and a wafer heat map related to data preprocessing according to an example embodiment.

Referring to FIG. 6B, red, green, blue (RGB) color separation may be performed such that an image may be divided into three color channels of red, green, and blue and separately displayed to be verified by color for each defect detection characteristic. Various brightness correction functions, such as gamma collection and brightness stretch, may be performed. By mapping each intensity value to color according to a table or a function through a pseudo-color image, it may be helpful to enlarge and easily identify a color change that slightly varies according to a thickness derived from a grayscale image. To this end, a pseudo-coloring function of displaying a thin portion in blue and a thick portion in red may be performed.

Referring to FIGS. 3, 6A, and 6B, the server 300 may perform preprocessing for defect detection within a wafer by adjusting a color and a brightness of the wafer according to a size of the wafer. The server 300 may separate and display a scanned image of the wafer such that the scanned image may be divided into three color channels of red, green, and blue and verified by color for each defect detection characteristic. The server 300 may correct a brightness of the scanned image of the wafer. The server 300 may map and display each intensity value for each pixel of the scanned image of the wafer to a color according to a table or a function.

Figure 7A:
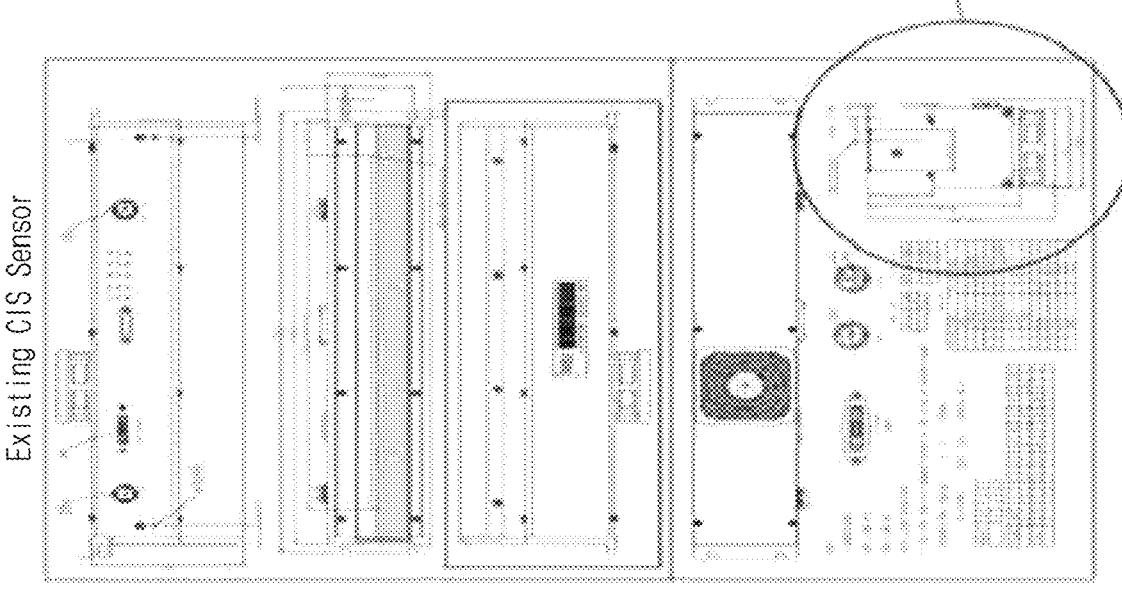
FIGS. 7A and 7B illustrate structural diagrams of a CIS driving control system according to an example embodiment.
Figure 7B:
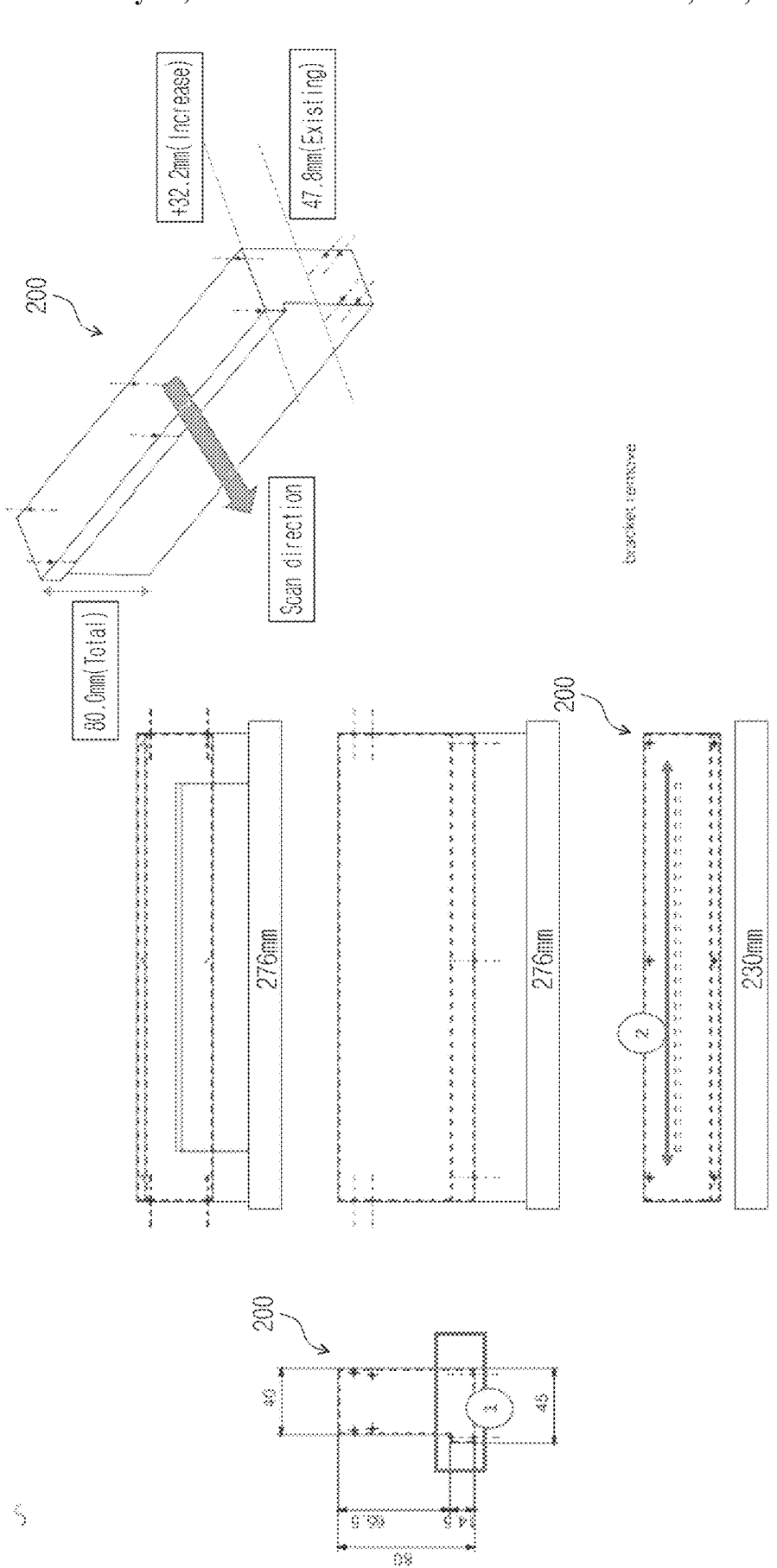
Figure 8A:
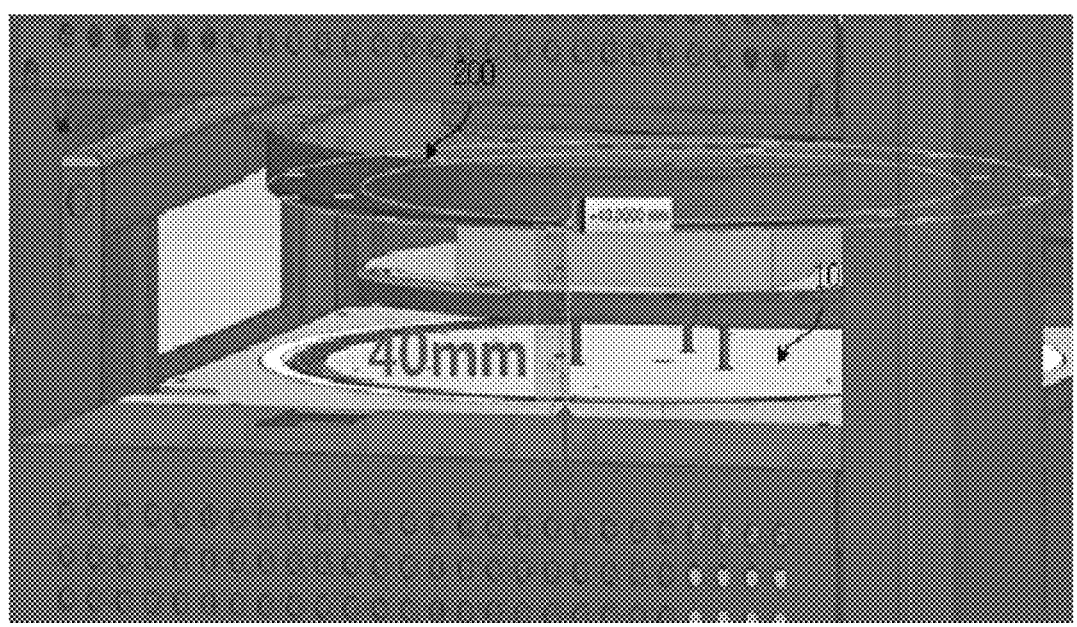
FIG. 8A is a side view of track equipment having an average height and FIG. 8B is a perspective view of a CIS device mounted to track equipment according to an example embodiment.
Figure 8B:
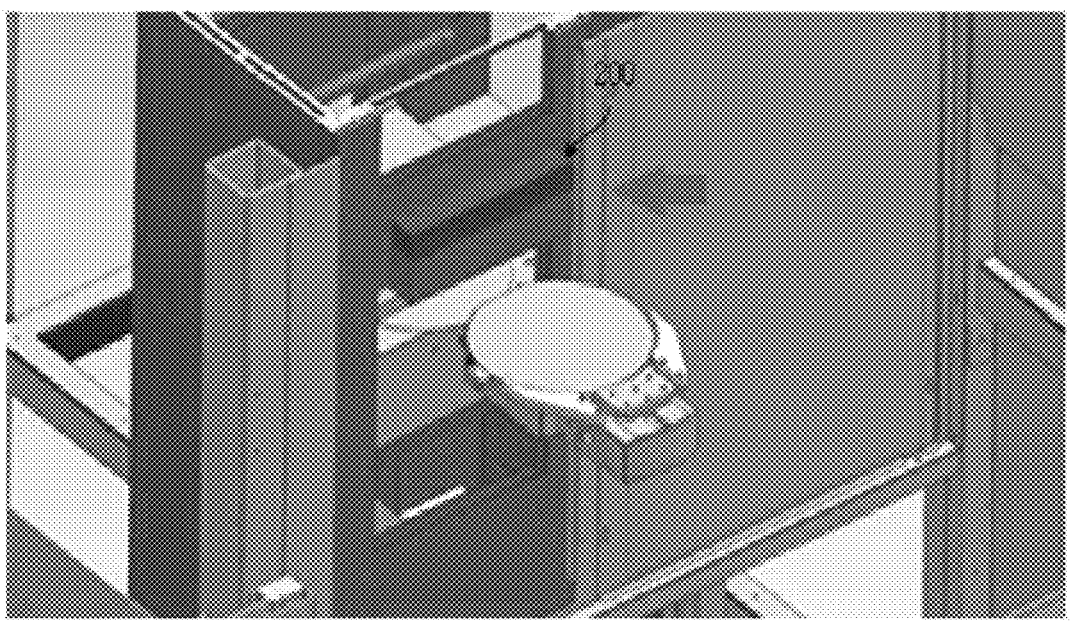

Meanwhile, the AI system for wafer defect detection according to an example embodiment may be configured to include a machine vision CIS driving control system. In this regard, FIGS. 7A and 7B illustrate structural diagrams of a CIS driving control system according to an example embodiment. FIG. 8A is a side view of track equipment having an average height and FIG. 8B is a perspective view of a CIS device mounted to track equipment according to an example embodiment.

Referring to FIGS. 7A and 7B, when a CIS module ready trigger is present at a robot operation and a specific position through SECS communication, a CIS ready signal operation scenario may be configured and designed. Device/layer/process job ID/recipe ID/wafer ID/slot ID may be configured to acquire wafer information through SECS communication. When a frame grabber trigger is present at a robot operation or a specific position through SECS communication, a frame grabber image capture signal operation scenario may be configured and designed.

Referring to FIGS. 7A, 7B, 8A, and 8B, when a height of the CIS device 200 is extended from 47.8 mm to 80.0 mm, an "L" portion of ① may be changed to 40 mm such that there is no protruding portion. Therefore, a collision may be prevented when transferring a wafer in a CIS driving control system. Meanwhile, if it is not easy to change the "L" portion to 40 mm due to an internal board, a horizontal length of ① may be changed from 45.0 mm to 40.0 mm and a horizontal length of ② may also be changed to 230 mm by vertically placing the board. Accordingly, the height of the CIS device 200 may be formed higher than 80.0 mm.

An optimal form of the CIS device 200 may be designed to have a field of view (FOV) area as low as 40 mm and to scan a wafer with a size of up to 300 mm. Also, the CIS device 200 may be configured to ensure no image distortion and to secure optimal performance of 4K resolution. The CIS device 200 has no thermal interference and a mounting position may be selected in consideration of a position to which all wafers move.

Referring to FIGS. 3, 7A, 7B, 8A, and 8B, when a driving control system operates or is present at a specific first position through a CIS module ready trigger, the CIS device 200 may acquire information related to the wafer that includes a device ID, a layer ID, a process job ID, a recipe ID, a wafer ID, and a slot ID. When the driving control system operates or is present at a specific second position through a frame grabber trigger, the CIS device 200 may acquire an image related to the wafer.

Meanwhile, the CIS device 200 of the AI system for wafer defect detection according to an example embodiment may be implemented in a CIS sensor structure specialized for a semiconductor photolithography process. In this regard, the photolithography process refers to a patterning process using light and uses a wavelength range of 365 nm or less.

Therefore, with a white lighting in general use, there is a pattern damage probability according to the same wavelength. Also, since a color image is required to classify and analyze various defect types within a wafer, an R, G, B light emitting diode (LED) lighting of 365 nm or more may be adopted. Also, to overcome limitation that mounting is impossible due to a narrow structure within photo equipment, a CIS sensor structure optimized for the photo equipment may be implemented.

In detail, the photolithography process refers to a process of performing coating and pattern exposure and may cause a pattern to disappear when exposed to a wavelength (ultraviolet) of 365 nm or less. Therefore, a light wavelength of 365 nm to 12 6 nm used for the pattern exposure needs to be avoided. R, G, and B lightings are used as a lighting for a CIS sensor used in the photolithography process and the respective wavelength bands of 630 nm, 520 nm, and 465 nm of the R, G, and B lightings may be configured as visible light wavelengths that may readily form a pattern on a wafer.

In this regard, the interior of the CIS device 200 may be configured using two rows of R, G, B LEDs. Meanwhile, 16 CMOS sensors may be embedded in a 200 mm wafer and 22 CMOS sensors may be embedded in a 300 mm wafer to match a wafer size of a semiconductor. Due to space and width constraints of photolithography process equipment, a board and sensor section that is a CIS controller may be separated into two stages. Also, the CMOS sensor may be made to have a width of 40 mm, thereby solving design and space constraints. FOV of CIS may be optimally designed to be 14.8 mm in consideration of a wafer transfer height, which may be implemented using a small value compared to 450 mm of a FOV of a general machine vision.

Meanwhile, a monitoring device of the AI system for wafer defect detection according to an example embodiment may operate in various modes and may display a screen. In this regard, FIGS. 9A, 9B, and 9C illustrate user interface (UI) screens displayed on a monitoring device in a plurality of modes according to example embodiments.

Figure 9A:
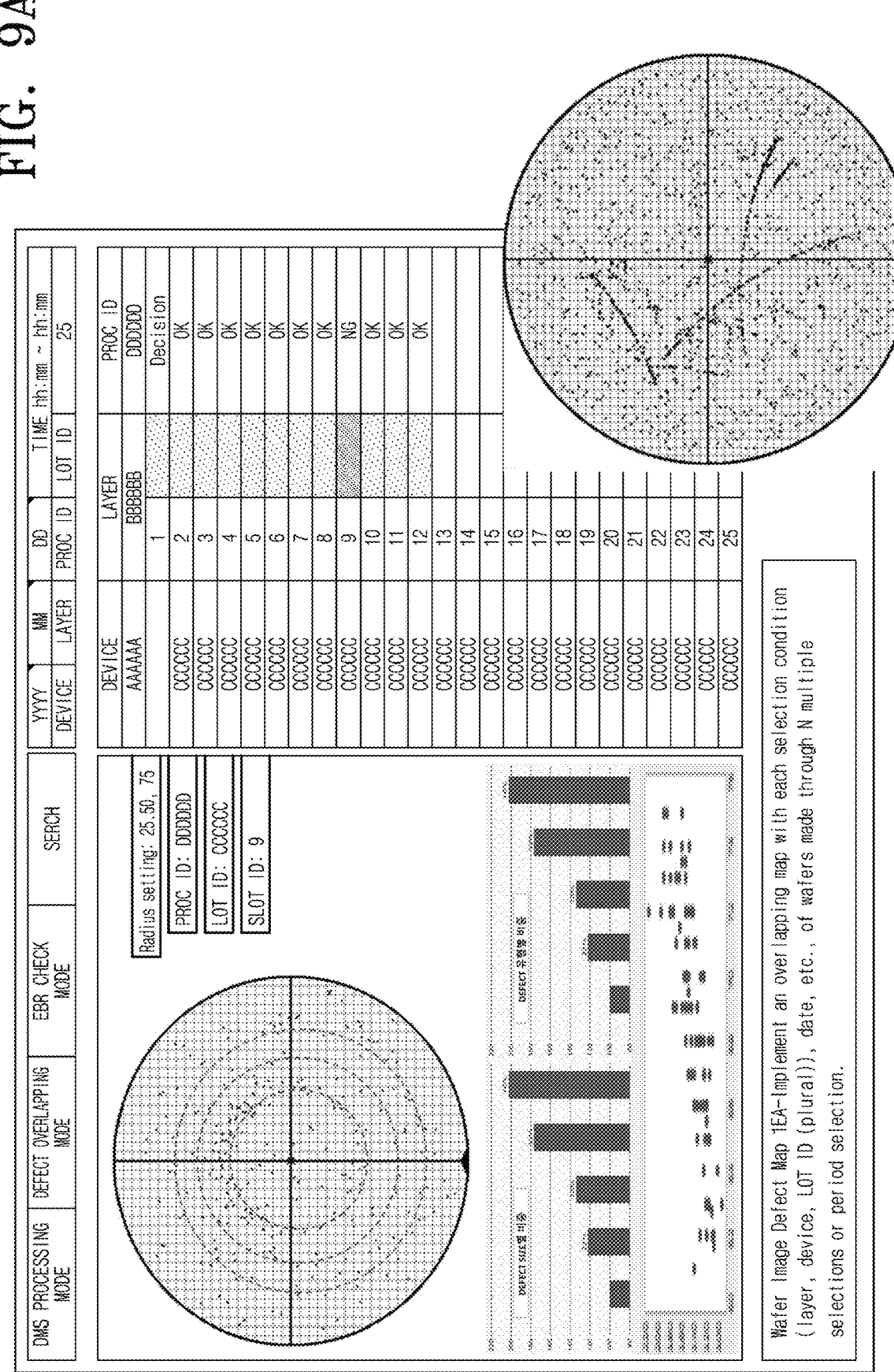
Figure 9C:
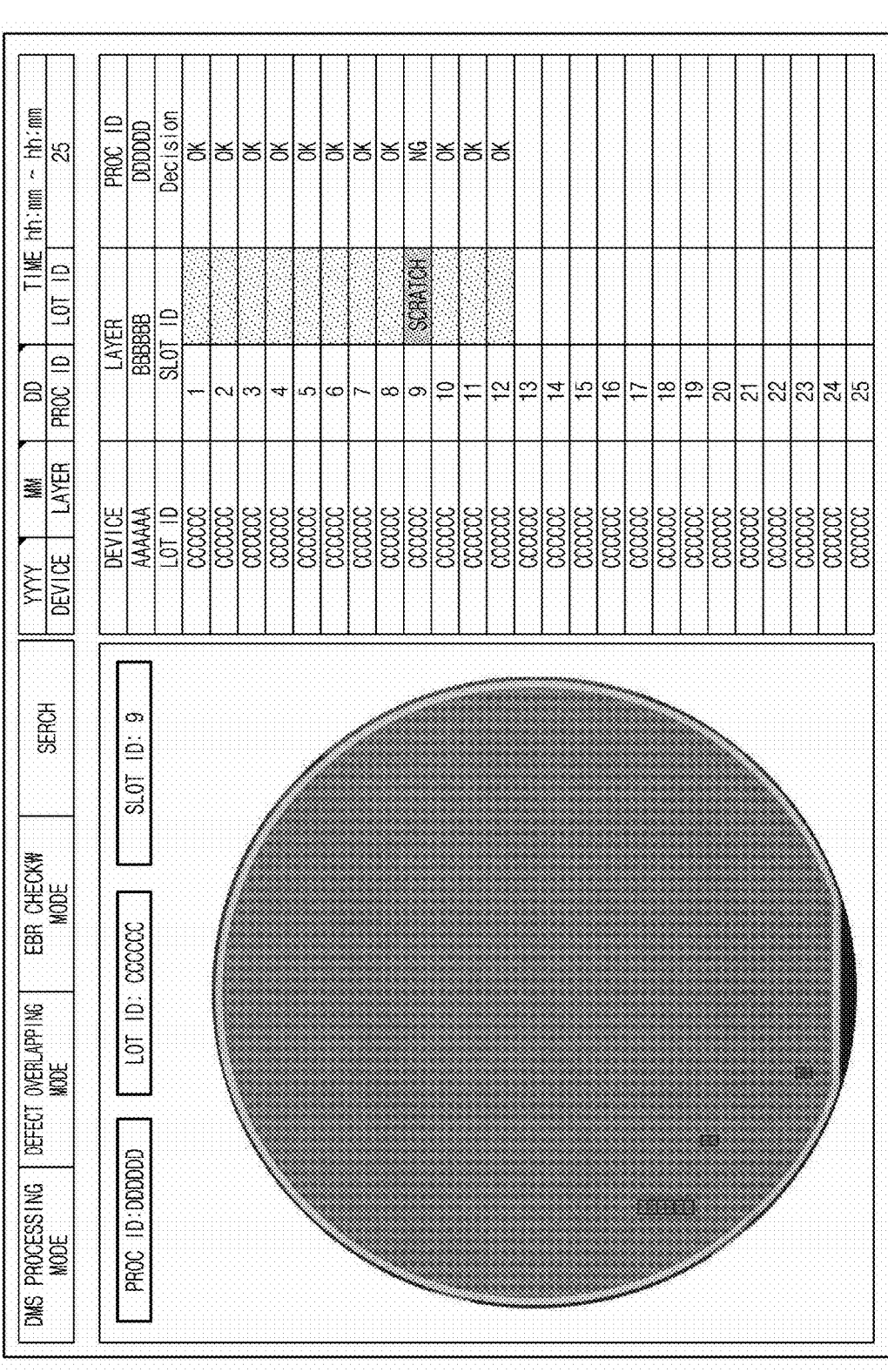

Referring to FIG. 9A, the cause of a defect may be specified according to a defect type by implementing an overlapping map. The monitoring device may accumulate and display X and Y coordinates of defect positions of wafers that have undergone the same process during 1 LOT (25 sheets) or a predetermined period in coordinate image of a single wafer. Therefore, a UI may be configured such that an engineer may perform an intuitive analysis (specify a defect unit based on a defect position and distribution).

Referring to FIGS. 3 and 9A, the monitoring device 400 may accumulate and display X and Y coordinates of a defect detection positions of wafers that have undergone the same process in a coordinate image of a wafer display on a display in a first mode that is a defect detection mode.

Referring to FIG. 9B, edge bead removal (EBR) data related to a wafer image currently in progress may be verified. An EBR trend may be designed to be verifiable when selecting a specific layer or LOT ID (selecting a slot). Regarding an EBR measurement mode of a wafer, photoresist may be applied while rotating during a wafer coating process. When rotational eccentricity occurs, an unnecessary part of the wafer may be moved using solvent and accordingly, photoresist may be removed up to a chip portion due to imbalance in an EBR size, resulting in a chip defect. Therefore, the EBR size needs to be periodically measured.

Meanwhile, whether eccentricity occurs during a wafer rotation may be managed by configuring a user interface (UI) to measure an EBR size from an end of the wafer to a position at which a pattern is removed as shown in FIG. 9B according to recipe settings for each process based on the acquired image and to manage the trend.

Referring to FIGS. 3 and 9B, the monitoring device 400 may display results measured from an end of each of wafers to the position at which the pattern is removed according to recipe settings for each process based on images of the wafers in a second mode that is an error check mode.

Referring to FIG. 9C, whether a corresponding wafer is normal or defective may be determined in real time. Normal and defect determination results may be displayed on a corresponding slot based on an image of a wafer currently in progress. If a defect occurs, information on a wafer in which the defect is detected may be transmitted to a FAB host such that a worker or an engineer may immediately verify the occurrence of the defect. Also, a display screen communicating with a host in real time may be designed to stop driving of equipment or hold LOT according to a FAB situation (system designed according to production line requirements).

Referring to FIGS. 3 and 9C, the monitoring device 400 may display results related to a wafer defect based on an image of a specific area of a wafer currently in progress in a third mode that is a real-time wafer defect determination mode.

The AI system for wafer defect detection according to an example embodiment is described above. The technical effect of the AI system for wafer defect detection according to an example embodiment may be summarized as below, but is not limited thereto.

According to some example embodiments, it is possible to provide an AI system for wafer defect detection.

According to some example embodiments, it is possible to provide an AI analysis system and a machine vision CIS device for detecting a wafer defect that occurs in a semiconductor photolithography process.

According to some example embodiments, it is possible to prevent a decrease in yield by quickly and accurately detecting a defective product in a semiconductor manufacturing process.

According to some example embodiments, it is possible to perform real-time monitoring by integrating AI deep learning and machine learning through development of an AI system for detecting a wafer defect that occurs in a photolithography process of a semiconductor manufacturing process.

According to some example embodiments, it is possible to learn defects that occur in exposure equipment and track equipment for each type and to provide statistics to a user through real-time monitoring.

According to some example embodiments, it is possible to develop a system capable of preventing continuous defect occurrence by immediately stopping an operation using a self-interlock.

The aforementioned features and effects of the disclosure will be apparent through the detailed description related to the accompanying drawings and accordingly those skilled in the art to which the disclosure pertains may easily implement the technical spirit of the disclosure.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An artificial intelligence (AI) system for wafer defect detection, the AI system comprising:
a CIS (Contact Image Sensor) device configured to mount to track equipment and to transmit a scanned image of a wafer to a database; and
a server configured to learn the scanned image, to distinguish a defect of the wafer for each defect category, to learn defects that occur in exposure equipment and the track equipment for each type, and to perform real-time monitoring,
wherein the server is configured to change a periodic sampling inspection to a total inspection method through the CIS device in response to occurrence of the defect in the wafer.

2. The AI system of claim 1, further comprising:
a monitoring device configured to control a job process for the exposure equipment and the track equipment in conjunction with the server and to transmit or receive information management and inspection results of the wafer.

3. The AI system of claim 2, wherein the server is configured to control an operation of corresponding equipment in which the defect occurred using an interlock to be stopped when the defect is determined to have occurred in the exposure equipment or the track equipment.

4. The AI system of claim 3, wherein the server comprises:
a first server configured to operate as a Manufacturing Execution System (MES) server of a wafer defect inspection monitoring system;
a second server configured to store the scanned image; and
a third server configured to operate as a Data Migration Service (DMS) server that is provided between the first server and the second server and to perform data processing on an image of the wafer.

5. The AI system of claim 4, wherein an image detected as a defective chip among the scanned images is separately stored in the first server of the wafer defect inspection monitoring system and learning of the image detected as the defective chip is separately performed in the third server, and
results and data of the separately performed learning are transmitted from the third server to the wafer defect inspection monitoring system.

6. The AI system of claim 5, wherein, when a trigger sensor is mounted to the track equipment, acquisition of the image starts in response to sensing of the trigger sensor and when the trigger sensor is absent, the image is acquired by verifying entry of the wafer using a vision algorithm and the acquired image and defective image are transmitted to the first server of the wafer defect inspection monitoring system through a Secure Shell File Transfer Protocol (SFTP) or a Network File System (NFS), and
inspection results for the defective chip are transmitted from the third server to the first server in response to an end signal indicating end of an inspection operation of the wafer or on the basis of the wafer or a LOT that is a batch of wafers.

7. The AI system of claim 4, wherein the third server is configured to remove noise according to a mechanical error occurring in the exposure equipment or the track equipment, to acquire an image difference on a pixel basis for each adjacent chip within the wafer, to learn a normal chip image and a defective chip image using a deep learning program, and to directly distinguish and register a normal chip and a defective chip on a chip basis within the wafer based on results of the learning.

8. The AI system of claim 4, wherein the server is configured to perform preprocessing for detecting the defect in the wafer by adjusting color and brightness of the wafer according to a size of the wafer, and
the server is configured to separately display the scanned image of the wafer into three color channels of red, green, and blue to be verified by color for each defect detection characteristic, to correct brightness of the scanned image of the wafer, and to map and display an intensity vale for each pixel of the scanned image of the wafer to a color according to a table or a function.

9. The AI system of claim 4, wherein the CIS device is configured to acquire information related to the wafer including a device ID, a layer ID, a process job ID, a recipe ID, a wafer ID, and a slot ID when a driving control system operates or is present at a specific first position through a CIS module ready trigger and to acquire an image related to the wafer when the driving control system operates or is present at a specific second position through a frame grabber trigger.

10. The AI system of claim 9, wherein the monitoring device is configured to accumulate and display X and Y coordinates of defect detection positions of wafers that have undergone the same process in a coordinate image of a wafer displayed on a display in a first mode that is a defect detection mode, to display results from an end of each of the wafers to a position at which a pattern is removed according to recipe settings for each process based on images of the wafers in a second mode that is an error check mode, and to display results related to a wafer defect based on an image of a specific area of a wafer currently in progress in a third mode that is a real-time wafer defect determination mode.

\*   \*   \*   \*   \*